US009334042B2

(12) United States Patent
Prud'Homme-Lacroix

(10) Patent No.: US 9,334,042 B2
(45) Date of Patent: May 10, 2016

(54) DEVICE FOR PROTECTING A ROTORCRAFT AGAINST A PYRAMID-SHAPED STRUCTURE FOR CARRYING A LOAD

(71) Applicant: AIRBUS HELICOPTERS, Marignane (FR)

(72) Inventor: Pierre Prud'Homme-Lacroix, Vitrolles (FR)

(73) Assignee: Airbus Helicopters, Marignane (FR)

( * ) Notice: Subject to any disclaimer, the term of this patent is extended or adjusted under 35 U.S.C. 154(b) by 139 days.

(21) Appl. No.: 14/195,055

(22) Filed: Mar. 3, 2014

(65) Prior Publication Data

US 2014/0252170 A1    Sep. 11, 2014

(30) Foreign Application Priority Data

Mar. 7, 2013  (FR) ...................................... 13 00521

(51) Int. Cl.
| | | |
|---|---|---|
| B64C 7/00 | (2006.01) | |
| B64C 27/00 | (2006.01) | |
| B64D 1/14 | (2006.01) | |
| B64D 1/22 | (2006.01) | |
| B64C 27/04 | (2006.01) | |

(52) U.S. Cl.
CPC .................. *B64C 7/00* (2013.01); *B64C 27/006* (2013.01); *B64D 1/14* (2013.01); *B64D 1/22* (2013.01); *B64C 27/04* (2013.01)

(58) Field of Classification Search
CPC .......... B64C 7/00; B64C 27/006; B64D 1/02; B64D 1/08; B64D 1/22; B64D 1/14; B64D 45/00; B66C 1/10
USPC ......................................... 244/121; 294/67.1
See application file for complete search history.

(56) References Cited

U.S. PATENT DOCUMENTS

| | | | |
|---|---|---|---|
| 3,044,818 A | 7/1962 | Tobey | |
| 3,446,469 A * | 5/1969 | Whitten | B63H 21/305 108/44 |
| 3,945,674 A * | 3/1976 | Ide | B66C 1/10 294/67.1 |
| 3,966,144 A * | 6/1976 | Gabriel | B64D 47/00 244/17.11 |
| 4,378,919 A | 4/1983 | Smith | |
| 5,069,318 A | 12/1991 | Kulesha et al. | |
| 5,190,248 A * | 3/1993 | Lee | B64D 25/00 137/67 |
| 5,344,203 A | 9/1994 | Tollenaere | |
| 5,816,536 A | 10/1998 | Boullet | |
| 6,189,834 B1 * | 2/2001 | Dietz | B64D 1/08 244/118.1 |
| 6,523,450 B1 * | 2/2003 | Schreiber | F41H 5/0428 244/121 |
| 6,598,831 B1 * | 7/2003 | Tardy | A62B 99/00 244/137.2 |
| 7,556,471 B1 * | 7/2009 | Gallagher | B63B 27/00 414/139.5 |
| 2006/0243854 A1 * | 11/2006 | Townsend | B64C 27/006 244/17.11 |
| 2012/0037759 A1 * | 2/2012 | Vorwald | B64D 1/22 244/137.4 |
| 2012/0132745 A1 * | 5/2012 | Fitzsimmons | B64C 1/06 244/118.5 |
| 2012/0193476 A1 | 8/2012 | Figoureux et al. | |
| 2014/0001312 A1 * | 1/2014 | Milliere | B64C 1/062 244/121 |

FOREIGN PATENT DOCUMENTS

| | | |
|---|---|---|
| EP | 2481671 | 8/2012 |
| WO | 9506585 | 3/1995 |

OTHER PUBLICATIONS

French Search Report for FR 1300521, Completed by the French Patent Office on Nov. 14, 2013, 6 Pages.

* cited by examiner

*Primary Examiner* — Tien Dinh
*Assistant Examiner* — Alexander V Giczy
(74) *Attorney, Agent, or Firm* — Brooks Kushman P.C.

(57) ABSTRACT

A protection device (20) for protecting a fuselage (2) of a rotorcraft (1) against a pyramid-shaped structure (10) for carrying a load, which pyramid-shape structure has a frame having a quadrilateral shape together with a first pair (13) of two arms (12) and a second pair (15) of two arms (14), each arm extending in elevation from the frame up towards an apex (16). The protection device includes a protective plate (21), a blade (30) secured to the protective plate (21) for exerting a force on the two arms of the first pair, and a chevron (40) provided with two branches connected to the protective plate (21) in order to tend to move the arms of the second pair transversely apart from each other.

14 Claims, 3 Drawing Sheets

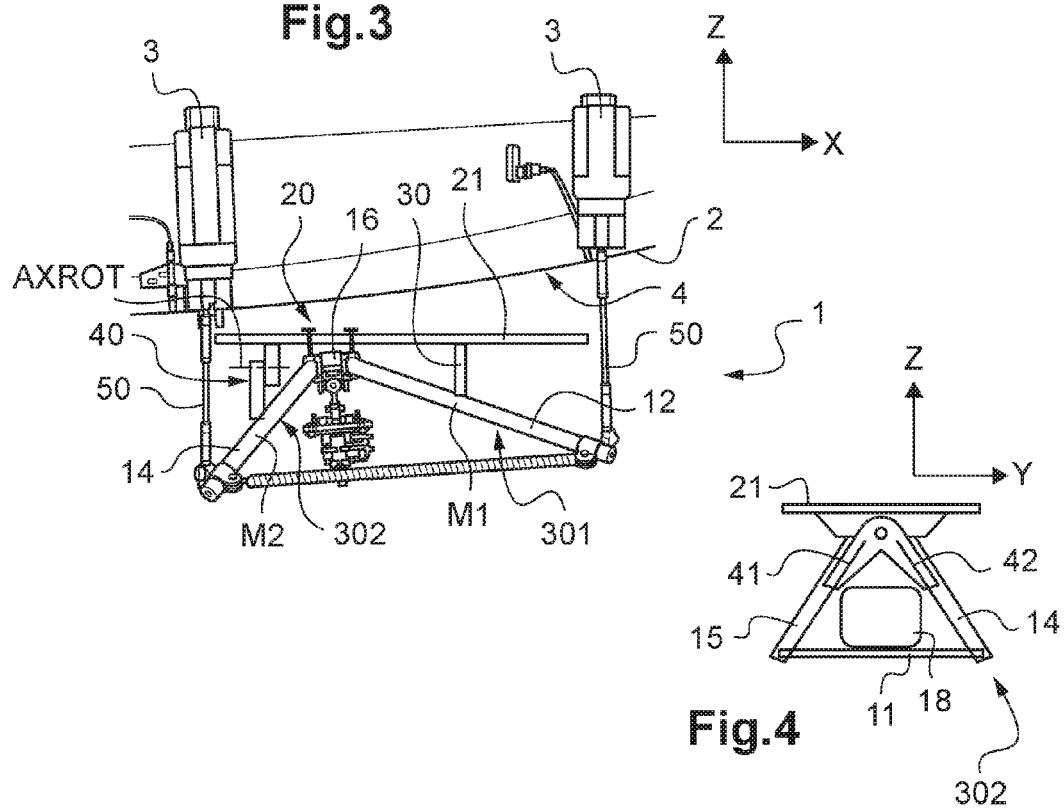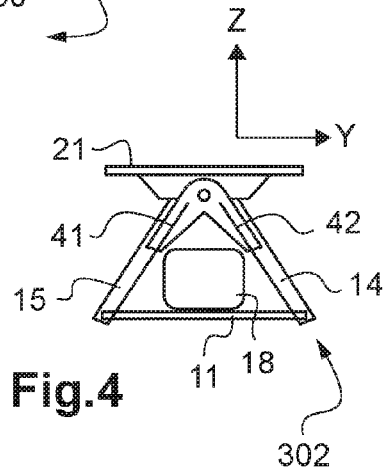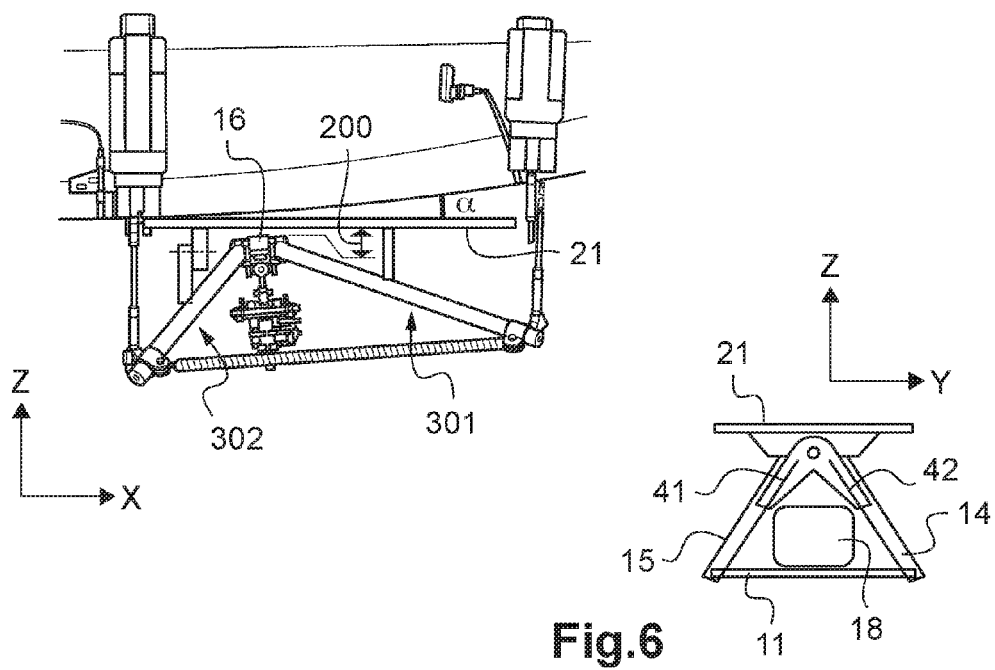

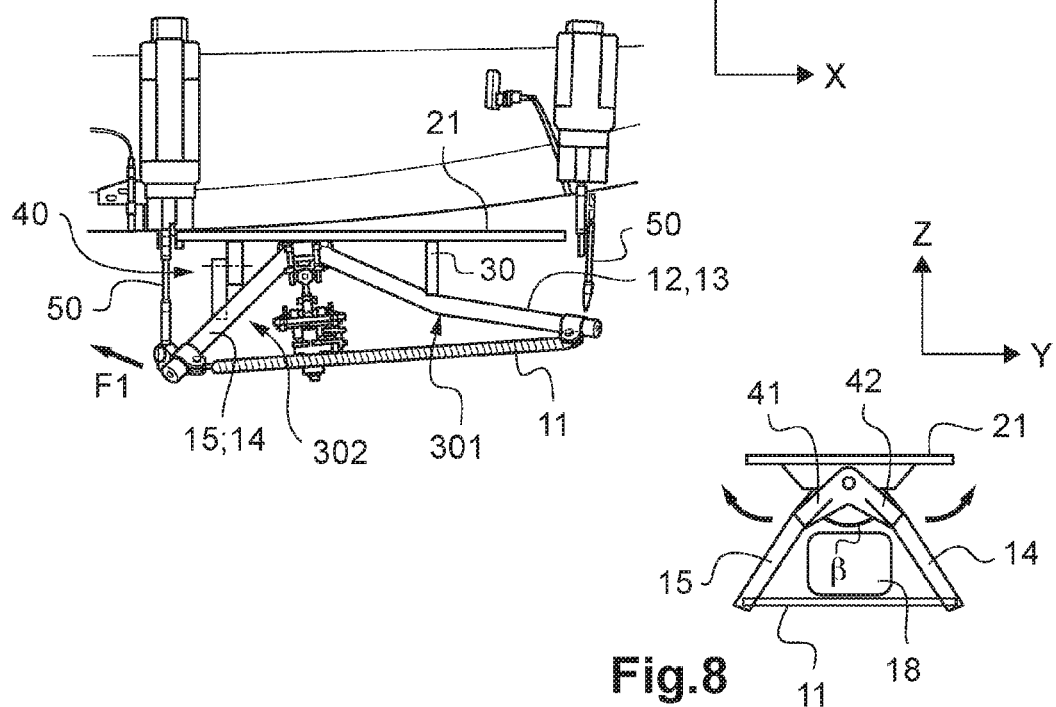
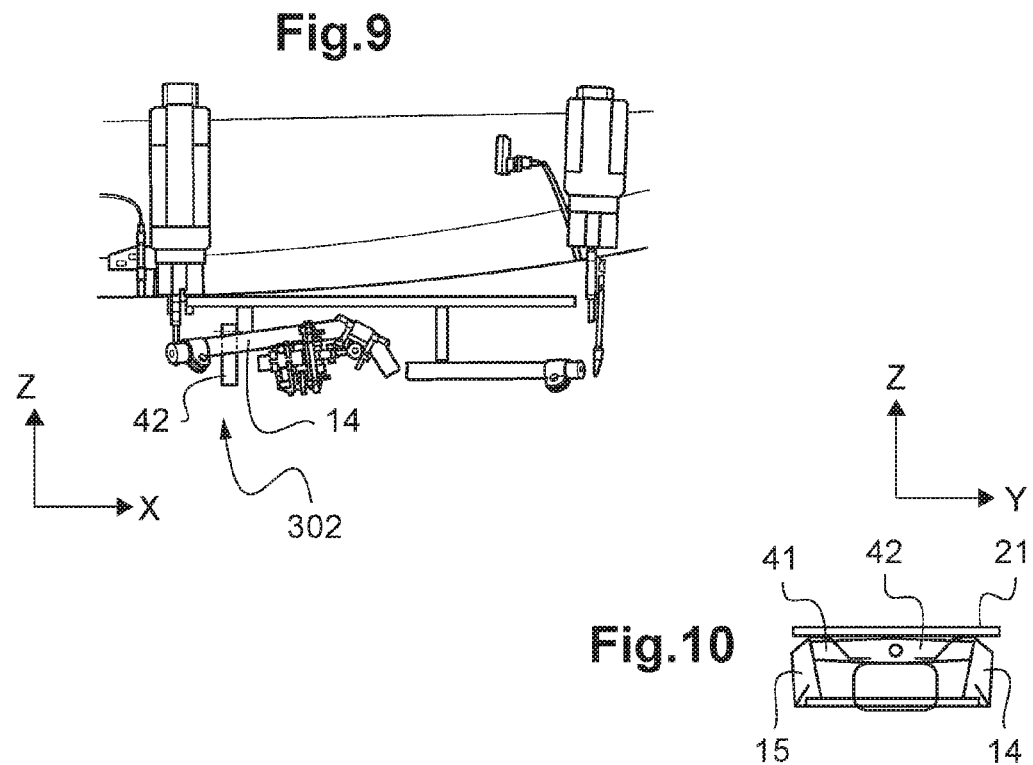

DEVICE FOR PROTECTING A ROTORCRAFT AGAINST A PYRAMID-SHAPED STRUCTURE FOR CARRYING A LOAD

CROSS REFERENCE TO RELATED APPLICATION

This application claims priority to French patent application No. FR 13 00521 filed on Mar. 7, 2013, the disclosure of which is incorporated in its entirety by reference herein.

BACKGROUND OF THE INVENTION (1) Field of the Invention

The present invention relates to a protection device for protecting a rotorcraft against a pyramid-shaped structure for carrying a load, to a fastener system provided with said device and with said structure, and to a rotorcraft provided with the fastener system. The invention also relates to a method of use.

The technical field of the invention is thus the field of devices for fastening an external load to an aircraft, and in particular to an aircraft having a rotary wing.

(2) Description of Related Art

Conventionally, a rotorcraft comprises a fuselage carrying at least one rotor for providing it with lift and possibly also with propulsion. The rotorcraft may then be provided with a releasable fastener system for carrying an external load.

Such a fastener system usually includes a release-hook that is optionally swivel-mounted and that is fastened to the fuselage by fastener means. A sling is then attached to the release-hook in order to enable external loads to be carried.

The fastener system may in particular by a system known as a "cargo swing", or as a "swing" for short.

The swing fastener system may include a pyramid-shaped structure. The pyramid-shaped structure has a frame having a quadrilateral shape and four arms, each arm extending in elevation from the frame up towards an apex.

More precisely, the pyramid-shaped structure possesses a pair of two front arms and a pair of two rear arms. The terms "front" and "rear" are used with reference to the forward direction of the aircraft.

In particular, the pyramid-shaped structure may possess two long arms and two short arms, with the apex then not being placed vertically over the intersection of the diagonals of the frame. For example, the front arms may be the short arms and the rear arms may be the long arms.

The frame may be made using four tubes connected together in pairs, each arm being fastened to one of the corners of the frame, for example. The frame may also be obtained using four independent tubes, each tube extending between two adjacent arms.

The fastener system may also be rigid or hinged.

The four arms may be connected so as to constitute the apex of the fastener system. The four arms are then secured to one another.

Nevertheless, the arms may be connected together in pairs. For example, the two front arms may have their top ends connected together, with the two rear arms also being connected together at their top ends. The top ends of the front and rear arms are then hinged about respective axes of rotation to a baseplate constituting the apex.

The two front arms thus constitute a front assembly that can pivot relative to a rear assembly constituted by the two rear arms.

The tubes constituting the frame of the pyramid-shaped structure are then adapted to accommodate such relative pivoting between the front and rear assemblies.

Independently of the type of fastener system, a release-hook is usually suspended from the apex of the pyramid-shaped structure. Movement of the release-hook within the fastener system is restricted to the zone defined by the frame of the pyramid-shaped structure.

The pyramid-shaped structure is also suspended under the fuselage, e.g. by four suspension cables.

The swing fastener system is in satisfactory use in the field of aviation.

Nevertheless, the pyramid-shaped structure can be dangerous in the event of the rotorcraft crashing.

During a crash, when the landing gear is deformed under the effect of the energy it absorbs, the pyramid-shaped structure comes into contact with the ground. The pyramid-shaped structure then runs the risk of perforating the fuselage, since the pyramid shape of such the structure makes it very strong against collapsing. The forces needed to collapse the pyramid-shaped structure are thus very great. The pyramid-shaped structure thus runs the risk of not collapsing, and thus of striking the fuselage and of perforating it.

The situation becomes even more complicated when a rotorcraft has its fuel tank in the bottom portion of the fuselage that also supports the pyramid-shaped structure.

In the bottom region of the fuselage, the rotorcraft then includes in particular a plate serving for example to receive pumps, level gauges, and other pieces of equipment of the fuel circuit. That plate is designed to withstand contact with the ground in the event of a crash in order to preserve the leak-tightness of the tank. Nevertheless, an impact against the apex of a pyramid-shaped structure can be destructive, and the plate runs the risk of not being able to withstand the forces delivered by the pyramid-shaped structure.

Furthermore, even if the pyramid-shaped structure does collapse, metal debris from the pyramid-shaped structure still presents a risk of perforating the tank.

Also known are documents EP 2 481 671, U.S. Pat. Nos. 3,044,818, 5,069,318, 5,344,203, 4,378,919, and WO 95/06585.

BRIEF SUMMARY OF THE INVENTION

An object of the present invention is thus to propose a protection device for protecting a rotorcraft against impact against a pyramid-shaped structure for carrying a load.

The invention thus provides a protection device for protecting a fuselage of a rotorcraft against a pyramid-shaped structure for carrying a load. The pyramid-shaped structure is provided with a frame having a quadrilateral shape and both with a first pair of two arms and also with a second pair of two arms, each arm extending in elevation upwards from the frame towards an apex.

The pyramid-shaped structure thus includes a front pair of arms and a rear pair of arms. The terms "front" and "rear" should be considered relative to the forward direction of the rotorcraft. The pyramid-shaped structure extends longitudinally from the front towards the rear of the rotorcraft, with the front arms being directed towards the front of the rotorcraft and the rear arms being directed towards the rear of the rotorcraft.

The protection device further includes:

a protective plate suitable for being interposed between the fuselage and the pyramid-shaped structure;

a blade secured to the protective plate for exerting a force on said two arms of the first pair in order to break them; and a chevron provided with two branches connected to the protective plate in order to tend to move said two arms of the second pair transversely apart from each other.

The function of the blade is to exert forces on one pair of arms in order to break the arms, with the chevron having the function of exerting forces on the other pair of arms in order to move them apart.

The protection device thus serves to generate breakage of a first pair of arms, e.g. the rear pair of arms, much more easily than by pressing on the apex of the pyramid-shaped structure.

Once they have been made unstable in this way, the arms of the second pair, i.e. the front arms in this example, bend under the effect of the chevron in particular, and that leads to the pyramid-shaped structure collapsing. Attachment means can then pivot so as to be received between the arms of the second pair.

For example, the force levels required for generating collapse are significantly smaller than in the conventional arrangement. These force levels can be withstood by a fuselage, and in particular by a plate carrying components of a fuel circuit.

In addition, the protective plate also performs the function of a shield that protects the fuselage against the debris that results from the pyramid-shaped structure collapsing.

Furthermore, the protective plate extends longitudinally from a front free end to a rear free end, and the blade and the chevron may be arranged between said front and rear free ends.

More precisely, the blade and the chevron are arranged longitudinally between the front and rear free ends, and they extend transversely and in elevation.

This characteristic makes it possible to optimize protection of the fuselage against the debris that results from the pyramid-shaped structure collapsing.

Furthermore, the branches may be secured to each other and are spaced apart by an angle that tends to increase under the effect of a force in elevation.

During a crash, the vertical forces involved tend to open out the chevron so as to increase said angle.

In a variant, the fastener device may include spreader means tending to spread the branches transversely apart from each other, such as a spring, for example. The two branches are then hinged to each other, the spreader means tending to press each branch against a respective arm of the second pair of arms.

Furthermore, each branch may be fastened to an arm of the second pair of arms so as to guarantee that these branches exert their transverse forces on these arms at positions that are predetermined by the manufacturer.

In a variant, each of the branches co-operates by shape interference with a respective one of the arms of the second pair of arms. By way of example, for this purpose, the branches may have a section that is L-shaped or U-shaped, or they may have any other section of sufficient strength.

In addition, said branches of the chevron may be hinged to said protective plate. This characteristic is particularly advantageous when the fastener system is a hinge system.

In addition to a protection device, the invention provides a system for fastening a load to a fuselage of a rotorcraft. The system comprises a pyramid-shaped structure for carrying a load, the pyramid-shaped structure being provided with a frame having a quadrilateral shape and both with a first pair of two arms and also with a second pair of two arms, each arm extending in elevation upwards from the frame towards an apex.

The fastener system includes a protection device as described above and comprising:

a protective plate suitable for being interposed between the fuselage and the pyramid-shaped structure;

a blade secured to the protective plate and in contact with the two arms of the first pair of arms; and a chevron provided with two branches connected to the protective plate so as to tend to move the arms of the second pair of arms transversely apart from each other.

This system may include one or more of the following additional characteristics.

For example, in flight, the blade may be in contact with the middles of each of the arms of the first pair of arms in order to facilitate breakage thereof.

Likewise, in flight, each branch may be in contact with the middle of a respective arm of the second pair of arms.

In addition, when the arms are hinged to said apex about an axis of rotation, the branches are optionally hinged to the protective plate in order to be capable of pivoting about this axis of rotation.

In addition, the protective plate may be fastened to the pyramid-shaped structure, such as an apex member of said pyramid structure for example. The blade and the chevron are thus always properly positioned relative to the arms.

The system may include clearance in elevation between the protective plate and the apex. This clearance in elevation seeks in particular to guarantee contact between the blade and the arms of the first pair of arms. In this way, the system ensures that the arms of the first pair bend at the time when the collapsing force is applied so as to encourage breaking of these arms.

Furthermore, the invention provides a rotorcraft having a fuselage. The rotorcraft is provided with a fastener system of the above-described type, the frame being suspended under a bottom surface of the fuselage by a plurality of suspension means.

For example, four suspension cables are attached to the frame or the arms in order to suspend the pyramid-shaped structure under the fuselage.

In addition, the arms of the first pair of arms are long, while the arms of the second pair of arms are short. The relative terms "long" and "short" serve to make it understood that the arms of the first pair are longer than the arms of the second pair.

Under such circumstances, the blade can easily cause the arms of the first pair of arms to break.

Finally, the invention provides a method of protecting a fuselage of a rotorcraft against a pyramid-shaped structure for carrying a load, the pyramid-shaped structure being provided with a frame having a quadrilateral shape and both with a first pair of two arms and also with a second pair of two arms, each arm extending in elevation upwards from the frame towards an apex. The method comprises the following steps:

pressing against the arms of the first pair to break them in order to cause the pyramid-shaped structure to pivot;

moving the arms of the second pair transversely apart from each other in order to cause the pyramid-shaped structure to collapse; and placing a protective plate between the pyramid-shaped structure and the fuselage in order to protect the fuselage from debris generated during the collapse of the pyramid-shaped structure.

Furthermore, said arms may be dimensioned so that the arms of the first pair are long and said arms of the second pair are short.

BRIEF DESCRIPTION OF THE SEVERAL VIEWS OF THE DRAWINGS

The invention and its advantages appear in greater detail from the context of the following description of embodiments given by way of illustration with reference to the accompanying figures, in which:

FIGS. 3 to 10 are diagrams explaining the method of the invention.

Elements present in more than one of the figures are given the same references in each of them.

DETAILED DESCRIPTION OF THE INVENTION

It should be observed that three mutually orthogonal directions X, Y, and Z are shown in some of the figures.

The first direction X is said to be "longitudinal". Terms such as "longitudinal", "front", and "rear" are used relative to this first direction.

The second direction Y is said to be "transverse". The term "transverse" relates to any direction parallel to the second direction Y.

Finally, the third direction Z is to be "in elevation". The term "in elevation" relates to any direction parallel to the third direction Z.

Figure 1:
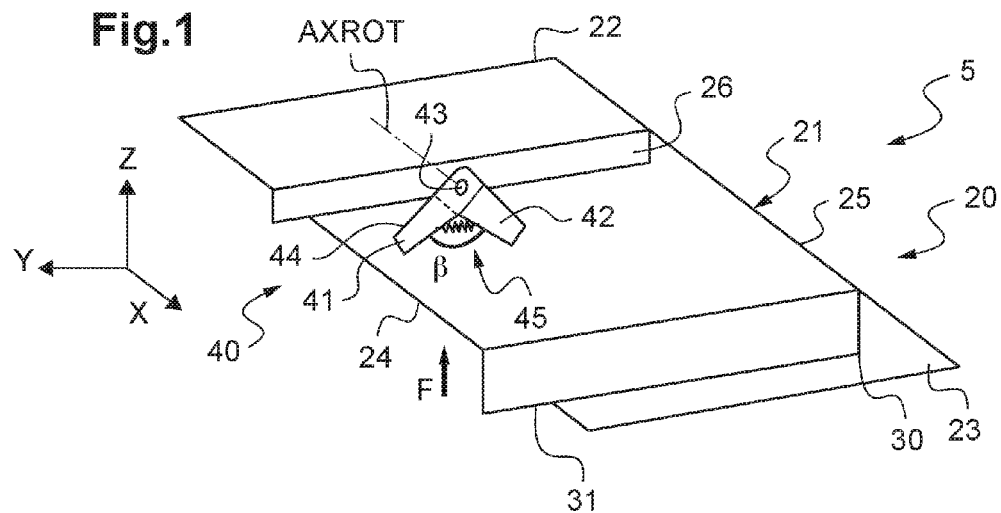
FIG. 1 shows a protection device of the invention.

FIG. 1 shows a protection device 20 of the invention.

The protection device 20 includes a protective plate 21 extending longitudinally from a front free end 22 towards a rear free end 23, and transversely from a right side 24 to a left side 25.

Furthermore, the protection device 20 possesses a blade 30 fastened of the protective plate. The blade 30 extends in elevation from the protective plate towards an edge 31, and transversely from the right side 24 towards the left side 25. The blade 30 is also arranged under the protective plate longitudinally between the front free end 22 and the rear free end 23.

FIG. 1 shows the blade as being continuous. Nevertheless, the blade 30 could present two discontinuous segments, each serving to cut through one of the arms of a fastener system.

In addition, the protection device 20 includes a chevron 40. The chevron 40 is fastened to the protective plate 20 by means of a support 26 extending transversely. The chevron 40 is also arranged under the protective plate, longitudinally between its front free end 22 and its rear free end 23.

The chevron 40 presents two branches 41 and 42 that are angularly spaced apart by an angle β.

The two branches may be fastened together so as to constitute a single piece 44. Vertical forces represented by arrow F then tend to open out the chevron so as to increase the angle β.

Alternatively, the two branches 41, 42 may be hinged to each other. Spacer means 45 then tend to open out the chevron by increasing the angle β.

Furthermore, the chevron may be hinged to the protective plate 21 about an axis of rotation AXROT.

The fastener device 20 is then used within a fastener system 5 for protecting a fuselage.

Figure 2:
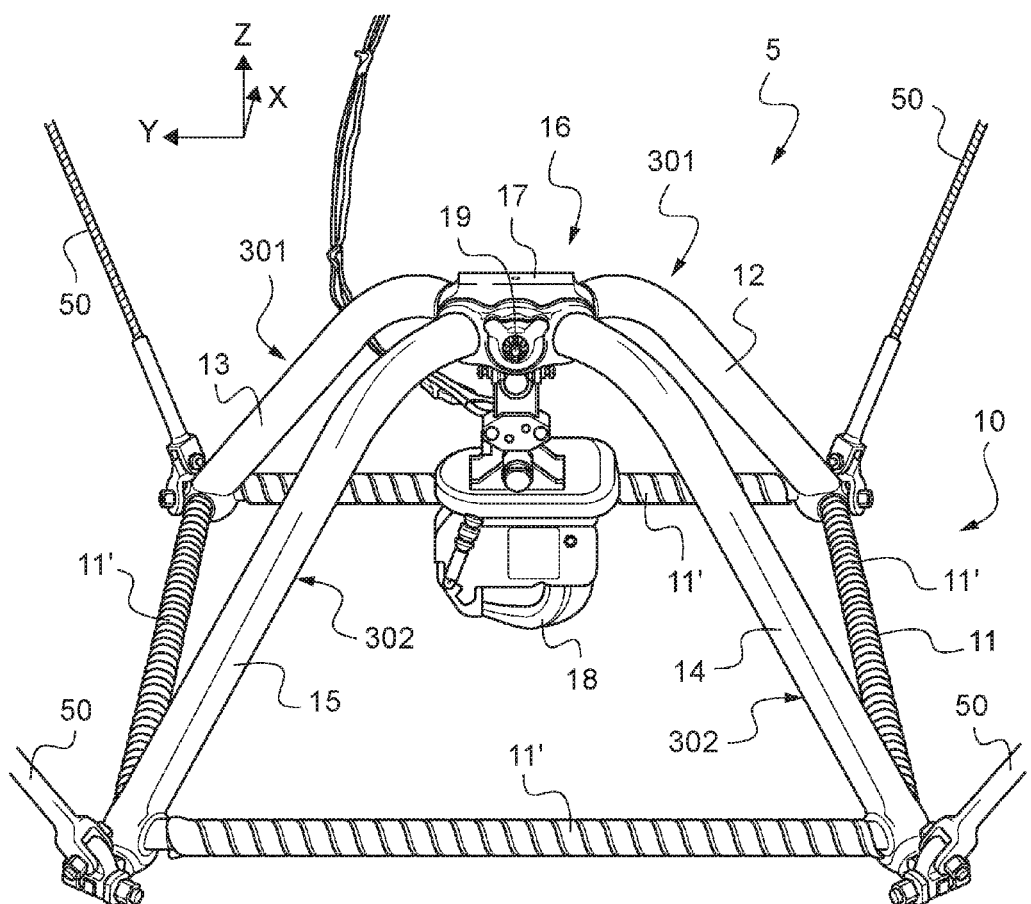
FIG. 2 is a diagram showing a pyramid-shaped structure.

The fastener system 5 comprises a pyramid-shaped structure 10 suitable for being suspended from a bottom surface of a fuselage by using suspension means 50. Four suspension cables are thus shown in FIG. 2.

The pyramid-shaped structure 10 extends in elevation upwards from a base towards an apex 16.

The base is constituted by a frame 11 of quadrilateral shape. The frame 11 has four tubes 11' defining it.

Furthermore, the pyramid-shaped structure includes four arms 12, 13, 14, and 15 extending upwards from the base of the pyramid structure towards its apex 16.

A bottom end of each arm 12, 13, 14, and 15 may then be connected to the frame 11. For example, each tube 11' of the frame 11 extends between the bottom ends of two respective arms.

The top ends of the arms 12, 13, 14, and 15 then terminate at the apex 16 of the pyramid-shaped structure.

The four arms include a first pair 301 of two arms 12 and 13 extending by way of example towards the rear of a rotorcraft, and a second pair 302 of two arms 14 and 15 extending towards the front of the rotorcraft. More precisely, and by way of example, the first pair has arms that are long, whereas the second pair has arms that are short.

The top ends of the four arms may be fastened to one another in order to constitute the apex 16.

It can be understood that the term "frame" designates a structure of quadrilateral shape comprising at least one mechanical member.

Nevertheless, in the example shown, the top ends of the two arms 14 and 15 of the second pair 302 are secured to each other and hinged to a baseplate 17 about an axis of rotation 19.

Likewise, the top ends of the two arms 12 and 13 of the first pair 301 are secured to each other and hinged to the baseplate 17 about the axis of rotation 19.

The pyramid structure also carries attachment means 18, such as a release hook. The attachment means may be fastened to the baseplate 17, or the baseplate 17 may form part of the attachment means 18.

Under such circumstances, and with reference to FIGS. 3 and 4, the protection device is interposed between the apex 16 of the pyramid-shaped structure and the bottom structure 4 of the fuselage 2 of a rotorcraft 1. The pyramid-shaped structure is suspended from strong frames 3 of the rotorcraft 1 by the suspension means 50.

The protection device may also be suspended from the aircraft under the fuselage.

Nevertheless, in the example shown in FIG. 3, the protective plate 21 is connected to the pyramid-shaped structure so as to be capable of being movable together with the pyramid-shaped structure. By way of example, the protective plate is fastened to the apex 16.

The protective plate may optionally be both suspended from the fuselage, and also connected to the pyramid-shaped structure.

Consequently, the blade 30 presses against the arms 12 and 13 of the first pair 301, e.g. in their middles M1.

In addition, each arm of the chevron is in contact at least transversely with a respective one of the arms 14, 15 of the second pair 302, e.g. in their middles M2.

Furthermore, when the arms 14, 15 of the second pair 302 are hinged to the apex 16 about an axis of rotation AXROT, the chevron may be hinged to the protective plate in order to be capable of pivoting about the axis of rotation AXROT together with the arms 14 and 15 of the second pair 302.

With reference to FIG. 4, each branch may co-operate by shape interference with an arm 14, 15 of the second pair 302 so that opening out the chevron tends to cause these arms 14, 15 of the second pair 302 to bend.

With reference to FIGS. 5 and 6, during an impact with the ground occurring under accident conditions, the pyramid-shaped structure comes into contact with the ground.

The protective plate is then pressed against the fuselage. Nevertheless, the protective plate may present an acute angle α with the bottom surface 4.

At this stage, clearance 200 in elevation might still remain between the protective plate and the apex 16 of the structure.

With reference to FIGS. 7 and 8, the rotorcraft continues to move down towards the ground.

The blade 30 then causes the arms 12 and 13 of the first pair 301 to break. These arms of the first pair 301 give way first because of the weakening induced by the force exerted by the blade 30.

During continuing movement of the aircraft towards the ground, the apex moves towards the ground along arrow F1, thus forcing the arms of the second pair 302 to tilt rearwards. This tilting tends to cause the attachment means to pivot.

The angle β of the front chevron 40 increases under a vertical force, given the pressure exerted against the arms 14 and 15 of the second pair 302. The chevron 40 thus forces the arms 14 and 15 of the second pair 302 to move apart a little.

With reference to FIGS. 9 and 10, the collapsing movement continues. The arms 12 and 13 of the first pair 301 then become completely deformed.

In addition, the arms 14, 15 of the second pair 302 are weakened laterally. These arms 14 and 15 of the second pair 302 buckle and tend to collapse vertically.

In addition, the chevron moving the arms 14 and 15 of the second pair 302 apart serves to release sufficient space for receiving the attachment means in a tilted position.

The protective plate also tends to protect the fuselage from the debris generated by the collapsing of the pyramid-shaped structure.

At the end of this stage relatively little energy has been absorbed. A tank housed in the fuselage can then be caused to impact against the protective plate at an acceptable speed.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A protection device for protecting a fuselage of a rotorcraft against a pyramid-shaped structure for carrying a load, the pyramid-shaped structure being provided with a frame having a quadrilateral shape, a first pair of two arms, and a second pair of two arms, each arm extending in elevation upwards from the frame towards an apex, wherein the protection device includes:
   a protective plate suitable for being interposed between the fuselage and the pyramid-shaped structure;
   a blade secured to the protective plate for exerting a force on the arms of the first pair in order to break them; and
   a chevron provided with two branches connected to the protective plate in order to tend to move the arms of the second pair transversely apart from each other.

2. The device according to claim 1, wherein the protective plate extends longitudinally from a front free end to a rear free end, and the blade and the chevron are arranged between the front and rear free ends.

3. The device according to claim 1, wherein the branches are secured to each other and are spaced apart by an angle that tends to increase under the effect of a force in elevation.

4. The device according to claim 1, wherein the protection device includes spreader means tending to spread the branches transversely apart from each other.

5. The device according to claim 1, wherein each of the branches co-operate by shape interference with a respective arm of the second pair of arms.

6. The device according to claim 1, wherein the branches are hinged to the protective plate.

7. A fastener system for fastening a load to a fuselage of a rotorcraft, the fastener system comprising a pyramid-shaped structure for carrying a load, the pyramid-shaped structure being provided with a frame with a quadrilateral shape, a first pair of two arms, and a second pair of two arms, each arm extending in elevation upwards from the frame towards an apex, wherein the fastener system includes a protection device comprising:
   a protective plate suitable for being interposed between the fuselage and the pyramid-shaped structure;
   a blade secured to the protective plate and in contact with the arms of the first pair of arms; and
   a chevron provided with two branches connected to the protective plate so as to tend to move the arms of the second pair of arms transversely apart from each other.

8. The system according to claim 7, wherein, in flight, the blade is in contact with the middle (M1) of the arms of the first pair of arms.

9. The system according to claim 7, wherein, in flight, each branch is in contact with the middle (M2) of the arms of the second pair of arms.

10. The system according to claim 7, wherein the arms are hinged to the apex about an axis of rotation (AXROT), and the branches are hinged to the protective plate in order to be capable of pivoting about the axis of rotation (AXROT).

11. The system according to claim 7, wherein the protective plate is fastened to the pyramid-shaped structure.

12. The system according to claim 11, wherein the fastener system includes clearance in elevation between the protective plate and the apex.

13. The system according to claim 7, wherein the arms of the first pair of arms are long, and the arms of the second pair of arms are short.

14. A rotorcraft having a fuselage, wherein the rotorcraft is provided with a fastener system for fastening a load to a fuselage of a rotorcraft, the fastener system comprising a pyramid-shaped structure for carrying a load, the pyramid-shaped structure being provided with a frame with a quadrilateral shape, a first pair of two arms, and a second pair of two arms, each arm extending in elevation upwards from the frame towards an apex, wherein the fastener system includes a protection device comprising:
   a protective plate suitable for being interposed between the fuselage and the pyramid-shaped structure;
   a blade secured to the protective plate and in contact with the arms of the first pair of arms; and
   a chevron provided with two branches connected to the protective plate so as to tend to move the arms of the second pair of arms transversely apart from each other, the frame being suspended under a bottom surface of the fuselage by a plurality of suspension means.

* * * * *